(12) United States Patent
Griffin et al.

(10) Patent No.: US 11,309,974 B2
(45) Date of Patent: Apr. 19, 2022

(54) QUANTUM CHANNEL ROUTING UTILIZING A QUANTUM CHANNEL MEASUREMENT SERVICE

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 412 days.

(21) Appl. No.: 16/407,362

(22) Filed: May 9, 2019

(65) Prior Publication Data

US 2020/0358536 A1 Nov. 12, 2020

(51) Int. Cl.
| | |
|---|---|
| *H04B 10/00* | (2013.01) |
| *H04B 10/70* | (2013.01) |
| *B82Y 10/00* | (2011.01) |
| *G06N 10/00* | (2022.01) |
| *H04L 9/08* | (2006.01) |
| *H04B 10/07* | (2013.01) |

(Continued)

(52) U.S. Cl.
CPC .............. *H04B 10/70* (2013.01); *B82Y 10/00* (2013.01); *G06N 10/00* (2019.01); *H04B 10/07* (2013.01); *H04L 9/0855* (2013.01); *H04B 10/07957* (2013.01); *H04B 10/25* (2013.01)

(58) Field of Classification Search
CPC .............. H04B 10/70; H04Q 11/0062; H04Q 11/0067; H04Q 2011/0064; H04Q 2011/0079; H04Q 2011/0086
See application file for complete search history.

(56) References Cited

U.S. PATENT DOCUMENTS

| 7,085,814 B1 | 8/2006 | Gandhi et al. |
| 7,853,011 B2 | 12/2010 | Kuang et al. |

(Continued)

FOREIGN PATENT DOCUMENTS

| CN | 104022947 A | 9/2014 |
| CN | 108365955 A | 8/2018 |

(Continued)

OTHER PUBLICATIONS

Author Unknown, "Hash Based Quantum Key Two Server Password Authentication," Chapter 5, Published at least as early as Jul. 12, 2018, 19 pages.

(Continued)

*Primary Examiner* — Daniel G Dobson
(74) *Attorney, Agent, or Firm* — Withrow & Terranova, PLLC

(57) ABSTRACT

Quantum channel routing utilizing a quantum channel measurement service is disclosed. A quantum channel router that is communicatively coupled to a plurality of quantum channels receives a message from a sender that is directed to a receiver. Each quantum channel is configured to convey a quantum message from a sender to a receiver. The quantum channel router identifies a quantum channel to which the receiver listens. The quantum channel router determines a message size of the message. It is determined that transmission of the message would exceed a maximum channel capacity of the quantum channel at a current point in time, and in response, the quantum channel router does not transmit the first message onto the first quantum channel at the current point in time.

20 Claims, 5 Drawing Sheets

(51) Int. Cl.
*H04J 14/00* (2006.01)
*H04B 10/079* (2013.01)
*H04B 10/25* (2013.01)

(56) References Cited

U.S. PATENT DOCUMENTS

| | | | |
|---|---|---|---|
| 9,195,980 | B2 | 11/2015 | Puura et al. |
| 9,495,644 | B2 | 11/2016 | Chudak et al. |
| 9,838,141 | B2 | 12/2017 | Martin |
| 9,847,913 | B2 | 12/2017 | Kanda et al. |
| 9,870,273 | B2 | 1/2018 | Dadashikelayeh et al. |
| 10,187,205 | B2 | 1/2019 | Guinnard et al. |
| 10,552,120 | B1 | 2/2020 | Vakili |
| 2009/0063686 | A1 | 3/2009 | Schmidt et al. |
| 2010/0332592 | A1 | 12/2010 | Hamada |
| 2011/0047292 | A1 | 2/2011 | Gould et al. |
| 2016/0071021 | A1 | 3/2016 | Raymond |
| 2016/0150043 | A1 | 5/2016 | Petronic et al. |
| 2016/0267032 | A1 | 9/2016 | Rigetti et al. |
| 2017/0272174 | A1 | 9/2017 | Brandenburger et al. |
| 2017/0357539 | A1 | 12/2017 | Dadashikelayeh et al. |
| 2018/0091440 | A1 | 3/2018 | Dadashikelayeh et al. |
| 2018/0144262 | A1 | 5/2018 | Roetteler et al. |
| 2018/0152295 | A1 | 5/2018 | Drost et al. |
| 2018/0307988 | A1 | 10/2018 | Fano et al. |
| 2019/0312723 | A1* | 10/2019 | Guo ............... H04L 9/0852 |
| 2020/0014619 | A1 | 1/2020 | Shelar et al. |
| 2020/0027029 | A1 | 1/2020 | Linvill |
| 2020/0177977 | A1* | 6/2020 | Brodsky ............... H04B 10/70 |

FOREIGN PATENT DOCUMENTS

| | | | |
|---|---|---|---|
| WO | 2017127850 | A1 | 7/2017 |
| WO | 2018111242 | A1 | 6/2018 |

OTHER PUBLICATIONS

Chong, Frederic, et al., "Programming languages and compiler design for realistic quantum hardware," Nature, vol. 549, Sep. 14, 2017, Macmillan Publishers Limited, 8 pages.

Gyongyosi, Laszlo, et al., "A Survey on Quantum Channel Capacities," IEEE Communications Surveys and Tutorials, vol. 20, Issue 2, Second Quarter 2018, pp. 1149-1204.

King, Christopher, et al., "Capacity of quantum channels using product measurements," Journal of Mathematical Physics, vol. 42, Issue 1, Jan. 2001, 19 pages.

Kollmitzer, Christian, et al., "Applied Quantum Cryptography," Lecture Notes in Physics 797, 2010, Springer-Verlag Berlin Heidelberg, 227 pages.

Lee, Chris, "New form of qubit control may yield longer computation times," Ars Technica, Jan. 26, 2018, WIRED Media Group, 5 pages.

Shor, Peter, "Capacities of Quantum Channels and How to Find Them," Mathematical Programming, vol. 97, Apr. 2003, 26 pages.

Trung, Truong, "Quantum Information System and the Security of Communication," Apr. 2014, pp. 115-121.

Wei, Shi-Jie, et al., "Efficient universal quantum channel simulation in IBM's cloud quantum computer," Science China Physics, Mechanics and Astronomy, vol. 61, Issue 7, Apr. 9, 2018, 13 pages.

Non-Final Office Action for U.S. Appl. No. 16/166,672, dated Apr. 14, 2020, 20 pages.

Non-Final Office Action for U.S. Appl. No. 16/166,672, dated Nov. 5, 2020, 26 pages.

Notice of Allowance and Examiner-Initiated Interview Summary for U.S. Appl. No. 16/166,672, dated May 14, 2021, 13 pages.

* cited by examiner

QUANTUM CHANNEL ROUTING UTILIZING A QUANTUM CHANNEL MEASUREMENT SERVICE

BACKGROUND

Quantum computing systems perform computations utilizing quantum-mechanical phenomena, such as superposition and entanglement. Unlike classical computing systems that process data encoded in binary bits, each of which is always in one of two definite states ("0" or "1"), quantum computing systems process data in units of quantum bits (qubits) that can be in superpositions of states. "Superposition" means that each qubit can represent both a "1" and a "0" at the same time. The qubits in a superposition can be correlated with each other (referred to as "entanglement"). That is, the state of a given qubit (whether it is a "1" or a "0") can depend on the state of another qubit. A quantum computing system with N qubits can be in a superposition of up to $2^N$ states simultaneously. Compared to the classical computing systems that can only be in one of these $2^N$ states at a particular time, quantum computing systems have higher computing power and may solve difficult problems that are intractable using the classical computing systems.

SUMMARY

The examples disclosed herein monitor the usage of a quantum channel in real-time to ensure that a quantum message can be transmitted on the quantum channel without exceeding a maximum channel capacity of the quantum channel.

In one example a method is disclosed. The method includes receiving, by a quantum channel router communicatively coupled to a plurality of quantum channels, a first message from a first sender of a plurality of senders. The first message is directed to a first receiver of a plurality of receivers, and each quantum channel is configured to convey a quantum message from a sender to a receiver. The method further includes identifying, by the quantum channel router, a first quantum channel to which the first receiver listens. The method further includes determining, by the quantum channel router, a first message size of the first message. The method further includes determining that transmission of the first message would exceed a maximum channel capacity of the first quantum channel at a current point in time. The method further includes, in response to determining that transmission of the first message would exceed the maximum channel capacity of the first quantum channel, not transmitting the first message onto the first quantum channel at the current point in time.

In another example a quantum computing system is disclosed. The quantum computing system includes one or more memories, and one or more processor devices coupled to the one or more memories. The one or more processor devices are to receive, by a quantum channel router communicatively coupled to a plurality of quantum channels, a first message from a first sender of a plurality of senders. The first message is directed to a first receiver of a plurality of receivers, and each quantum channel is configured to convey a quantum message from a sender to a receiver. The one or more processor devices are further to identify, by the quantum channel router, a first quantum channel to which the first receiver listens. The one or more processor devices are further to determine, by the quantum channel router, a first message size of the first message. The one or more processor devices are further to determine that transmission of the first message would exceed a maximum channel capacity of the first quantum channel at a current point in time, and in response to determining that transmission of the first message would exceed the maximum channel capacity of the first quantum channel, not transmit the first message onto the first quantum channel at the current point in time.

In another example a computer program product is disclosed. The computer program product is stored on a non-transitory computer-readable storage medium and includes instructions to cause one or more processor devices to receive, by a quantum channel router communicatively coupled to a plurality of quantum channels, a first message from a first sender of a plurality of senders. The first message is directed to a first receiver of a plurality of receivers, and each quantum channel is configured to convey a quantum message from a sender to a receiver. The instructions further cause the one or more processor devices to identify, by the quantum channel router, a first quantum channel to which the first receiver listens. The instructions further cause the one or more processor devices to determine, by the quantum channel router, a first message size of the first message. The instructions further cause the one or more processor devices to determine that transmission of the first message would exceed a maximum channel capacity of the first quantum channel at a current point in time and, in response to determining that transmission of the first message would exceed the maximum channel capacity of the first quantum channel, not transmit the first message onto the first quantum channel at the current point in time.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
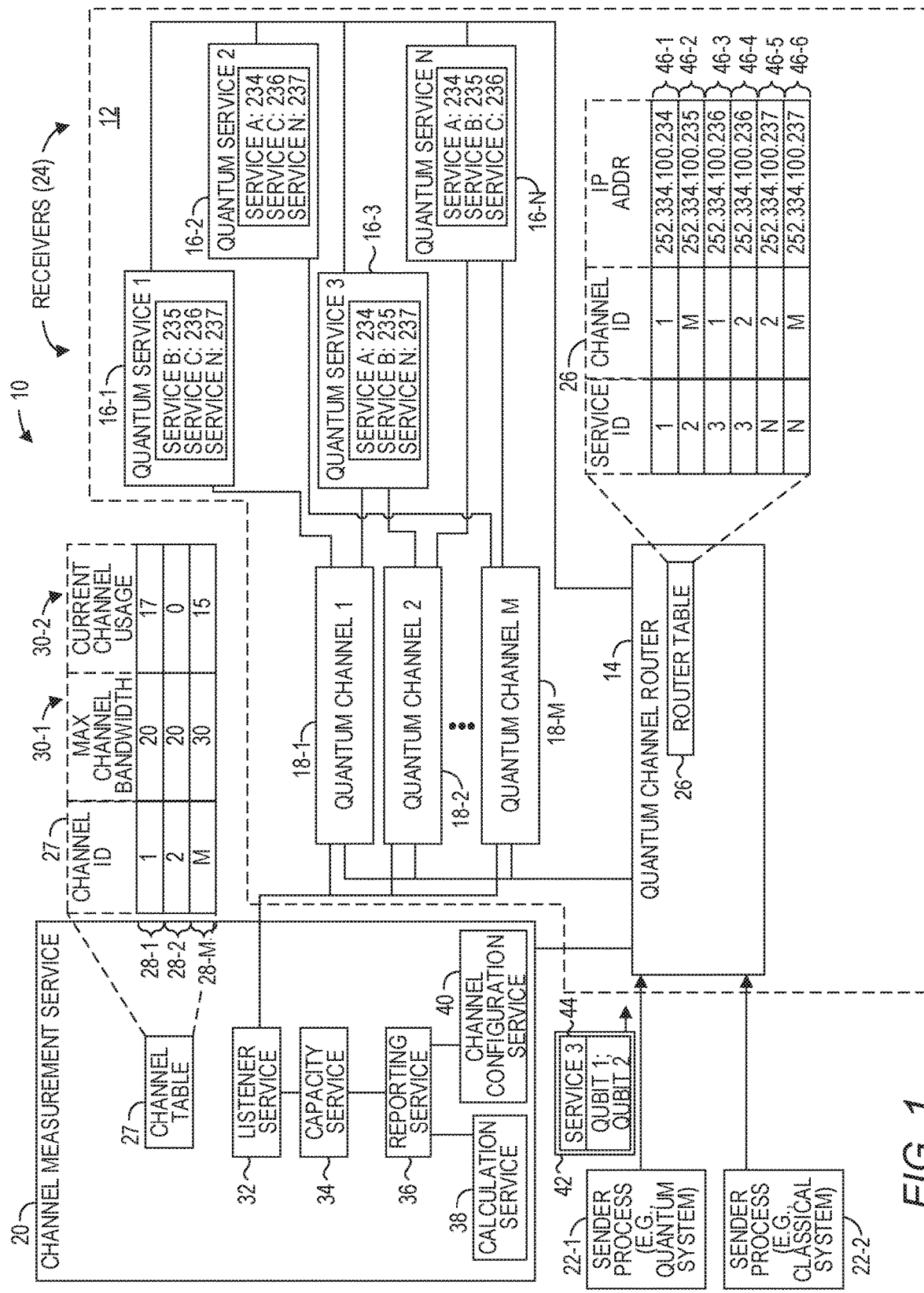
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing is an emerging research field. There now exists a number of publicly available qubit machines against which the Open Source Community can write simulations. Currently, there are no formal software patterns, paradigms or informed architectures devised for quantum computing systems.

Quantum computing systems utilize a quantum channel that is configured to convey a quantum message from a sender to a recipient. Currently, quantum channel utilization is not overly important because the specially designed quantum computers have limited functionality, are aware of the sizes of any messages that are likely to be sent over a quantum channel, and control when such messages are sent over a quantum channel. As the use of quantum computing systems becomes more common, as seems likely, a device, such as quantum channel router, will likely manage the use of a quantum channel that is shared by a plurality of different entities to convey data, such as quantum messages, to one another.

The examples disclosed herein implement a quantum channel measurement service that operates to determine a current available capacity of a quantum channel so that a message that would exceed the current available capacity of the quantum channel is not transmitted on the quantum channel. In particular, the quantum channel measurement service can determine a maximum channel capacity of a quantum channel, and determine a current channel usage of the quantum channel to thereby determine the current available capacity of the quantum channel. Given a size, or an estimated size, of a message to be inserted onto the quantum channel, the quantum channel measurement service can indicate whether inserting the message onto the quantum channel would exceed the current available capacity of the quantum channel. If so, the message may be sent at a subsequent point in time, or another quantum channel may be utilized to convey the message.

FIG. 1 is a block diagram of an environment 10 in which examples may be practiced. The environment 10 includes a quantum computing system 12 that operates in a quantum environment. The phrase "quantum environment" as used herein refers to computing systems that perform computations utilizing quantum-mechanical phenomena, such as superposition and entanglement. Such computing systems often operate under certain environmental conditions, such as at or near 0° Kelvin. The phrase "classical environment" as used herein refers to a conventional computing system that operates using binary digits that have a value of either 1 or 0.

The quantum computing system 12 includes a quantum channel router 14 that is communicatively coupled to a plurality of quantum services 16-1, 16-2, 16-3, and 16-N (generally quantum services 16) via a plurality of quantum channels 18-1, 18-2, and 18-M (generally quantum channels 18). While for purposes of illustration only four quantum services 16 are illustrated, the examples are not limited to any particular number of quantum services 16, and in practice, the quantum computing system 12 may have tens, hundreds or even thousands of quantum services 16.

The quantum channel router 14 is communicatively coupled to, or in some examples includes, a channel measurement service 20 that operates to determine a current available capacity of any of the quantum channels 18-1-18-M, as will be discussed in greater detail herein. The quantum channel router 14 can receive messages from senders 22-1-22-2, which may comprise, for example either a quantum computing system or a classical computing system. In this example, the sender 22-1 is a quantum computing system and the sender 22-2 is a classical computing system. Based on metadata associated with messages received from the senders 22-1-22-2, the quantum channel router 14 selects a quantum channel 18 and inserts (i.e., transmits or sends) the message onto the selected quantum channel 18.

A plurality of receivers 24 are communicatively coupled to one or more of the quantum channels 18-1-18-M. In this example, the receivers 24 comprise the plurality of quantum services 16-1-16-N, each of which is communicatively coupled to one or more of the quantum channels 18-1-18-M. In particular, in this example, the quantum service 16-1 is communicatively coupled to the quantum channel 18-1; the quantum service 16-2 is communicatively coupled to the quantum channel 18-M; the quantum service 16-3 is communicatively coupled to the quantum channels 18-1 and 18-2; and the quantum service 16-N is communicatively coupled to the quantum channels 18-2 and 18-M. The quantum channel router 14 maintains a router table 26 that identifies the quantum channels 18-1-18-M to which each of the quantum services 16-1-16-N is communicatively coupled. Although the quantum services 16-1-16-N are referred to as receivers, the quantum services 16-1-16-N may also be able to send messages to a sender 22 in response to a received message, or send messages to other quantum services 16-1-16-N. Thus, in some examples the quantum services 16-1-16-N may also be communicatively coupled directly to the quantum channel router 14 to facilitate sending messages from one of the quantum services 16-1-16-N to other quantum services 16-1-16-N, or sending messages to one or more of the senders 22-1-22-2. The quantum services 16-1-16-N may each include a table of addresses, such as internet protocol (IP) addresses of the other quantum services 16-1-16-N to facilitate message exchange between the quantum services 16-1-16-N.

The channel measurement service 20 includes a channel table 27 that maintains a row 28-1-28-M of information about each quantum channel 18-1-18-M. In particular, a column 30-1 identifies a maximum channel capacity for each quantum channel 18-1-18-M. The maximum channel capacity may be identified, for example, by an operator or via configuration information corresponding to each quantum channel 18-1-18-M. A column 30-2 identifies, for each quantum channel 18-1-18-M, a current channel usage.

In this example the channel measurement service 20 includes a listener service 32 that is configured to "listen" to each of the quantum channels 18-1-18-M to detect the transmission by the quantum channel router 14 of a message onto a quantum channel 18-1-18-M. The quantum channels 18-1-18-M are capable of communicating either classical or quantum data. Both classical and quantum messages transmitted via a quantum channel 18-1-18-M includes metadata that identifies, for example, an address of a recipient, such as an address of one of the quantum services 16-1-16-N, and a size of the classical or quantum message. The size of a classical message may be identified in absolute bits or bytes of information. Size of a quantum message may be an estimate based on a potential state space of the number of qubits in the quantum message, and will be discussed in greater detail below. When the listener service 32 detects a message being transmitted on a quantum channel 18-1-18-M the listener service 32 sends a capacity service 34 a message that identifies the size of the message and the quantum channel 18-1-18-M on which the message was transmitted. At a point in time after detecting the presence of a message on a quantum channel 18-1-18-M, the listener service 32 may subsequently detect that the message is no longer on the quantum channel 18-1-18-M, and apprise the capacity service 34 of this.

The capacity service 34 receives messages from the listener service 32 that identifies what is currently being transmitted on each of the quantum channels 18-1-18-M and aggregates the messages for each channel to maintain a current channel usage of each quantum channel 18-1-18-M. Upon request, the capacity service 34 provides this information to a reporting service 36 that interacts with the quantum channel router 14 to advise the quantum channel router 14 whether a message of a given size can be transmitted on a quantum channel 18-1-18-M at a given point in time. The reporting service 36 includes a calculation service 38 that determines, based on the current channel usage of a quantum channel 18-1-18-M and the maximum channel capacity of the quantum channel 18-1-18-M, a current available capacity of the quantum channel 18-1-18-M. The reporting service 36 utilizes this information to advise the quantum channel router 14 whether a message can be transmitted on a quantum channel 18-1-18-M without exceeding the maximum channel capacity of the quantum channel 18-1-18-M. A channel configuration service 40 accesses configuration information for the quantum channels 18-1-18-M to determine the maximum channel capacity of the quantum channels 18-1-18-M.

For purposes of illustration, assume that the sender 22-1, a quantum computing system, sends a message 42 to the quantum channel router 14. The message 42 includes metadata 44 that identifies a destination address of the quantum service 16-3. The message 42 is a quantum message and is encoded across two qubits. In some examples the metadata 44 may also identify a size of the message 42. Since the message 42 comprises a quantum message, the size may be an estimate based on a potential state space of the number of qubits in the quantum message 42. If the metadata 44 does not identify a size of the message 42, the quantum channel router 14 may determine a size of the message 42, via, for example, a von Neumann measurement of the message 42. While for purposes of illustration the sender 22-1 is illustrated as being a different quantum computing system than the quantum computing system 12, in practice the sender 22-1 may be another process within the quantum computing system 12.

The quantum channel router 14 accesses the router table 26, which contains a plurality of rows 46-1-46-6, each row corresponding to a particular quantum service 16-1-16-N, and identifying one or more quantum channels 18-1-18-M to which the respective quantum service 16-1-16-N listens. Based on rows 46-3 and 46-4, the quantum channel router 14 determines that the quantum service 16-3 listens to quantum channels 18-1 and 18-2.

The quantum channel router 14 selects the quantum channel 18-1 to transmit the message 42 to the quantum service 16-3. Where a quantum service 16-1-16-N listens to a plurality of quantum channels 18-1-18-M, the quantum channel router 14 may utilize an algorithm, or methodology, to select a particular quantum channel 18-1-18-M on which to transmit a message. In one example, the quantum channel router 14 may utilize a round-robin methodology to select a particular quantum channel 18-1-18-M. Thus, the quantum channel router 14 may retain data identifying which quantum channel 18-1-18-M was last used to transmit a message to a respective quantum service 16-1-16-N, and select a next quantum channel 18-1-18-M for each successive message that is to be sent to the respective quantum service 16-1-16-N.

The quantum channel router 14 sends a message to the channel measurement service 20 that identifies the quantum channel 18-1 and includes the size of the message 42. The channel measurement service 20 accesses the row 28-1 of the channel table 27 to determine the maximum channel capacity and the current channel usage of the quantum channel 18-1. The channel measurement service 20 determines the current available capacity of the quantum channel 18-1 based on a difference between the maximum channel capacity and the current channel usage of the quantum channel 18-1.

The channel measurement service 20 may send the quantum channel router 14 the current available capacity of the quantum channel 18-1, or may simply advise the quantum channel router 14 whether the message 42 can be transmitted onto the quantum channel 18-1 without exceeding the maximum channel capacity of the quantum channel 18-1. The quantum channel router 14 thereby determines whether the transmission of the message 42 on the quantum channel 18-1 would exceed the maximum channel capacity of the quantum channel 18-1 at the current point in time. If not, the quantum channel router 14 transmits the message 42 onto the quantum channel 18-1 for receipt by the quantum service 16-3. If the quantum channel router 14 determines that transmission of the message 42 on the quantum channel 18-1 would exceed the maximum channel capacity of the quantum channel 18-1 at the current point in time, the quantum channel router 14 may repeat the process for the quantum channel 18-2 to determine whether the message 42 can be sent to the quantum service 16-3 via the quantum channel 18-2. If the quantum channel router 14 determines that transmission of the message 42 on the quantum channel 18-2 would exceed the maximum channel capacity of the quantum channel 18-2 at the current point in time, the quantum channel router 14 may send the sender 22-1 a message to retry sending the message 42 at a future point in time.

For purposes of illustration, assume that the quantum channel router 14 determines that the transmission of the message 42 on the quantum channel 18-1 would not exceed the maximum channel capacity of the quantum channel 18-1 at the current point in time. The quantum channel router 14 then transmits the message 42 onto the quantum channel 18-1 for receipt by the quantum service 16-3, and includes metadata in the transmission that identifies the size of the message 42. When the message 42 appears on the quantum channel 18-1, the listener service 32 detects the presence of the message 42 and accesses the metadata that identifies the size of the message 42. The listener service 32 sends the size of the message 42 and an identifier of the quantum channel 18-1 to the capacity service 34, which updates row 28-1 of the channel table 27 to identify the current channel usage of the quantum channel 18-1.

Figure 2:
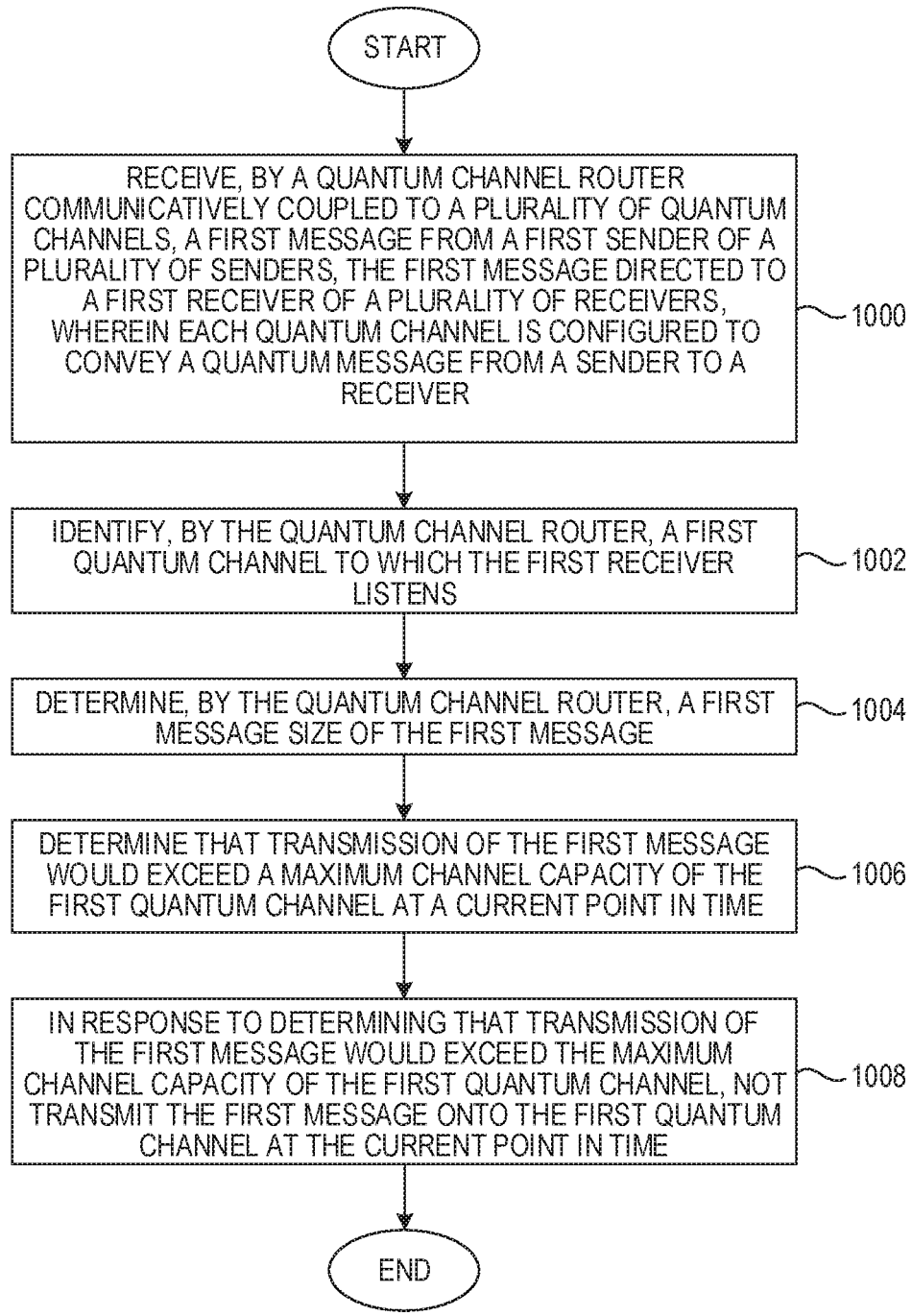
FIG. 2 is a flowchart of a method for quantum channel routing utilizing a quantum channel measurement service according to one example.

FIG. 2 is a flowchart of a method for quantum channel routing utilizing a quantum channel measurement service according to one example. FIG. 2 will be discussed in conjunction with FIG. 1. The quantum channel router 14 is communicatively coupled to the plurality of quantum channels 18-1-18-M, and receives the message 42 from the sender 22-1 of the plurality of senders 22-1-22-2. The message 42 is directed to a first receiver (e.g., the quantum service 16-3) of the plurality of receivers (e.g., the quantum services 16-1-16-N), wherein each quantum channel 18-1-18-M is configured to convey a quantum message from a sender 22-1-22-2 to a receiver 24 (FIG. 2, block 1000).

The quantum channel router 14 identifies the quantum channel 18-1 as a quantum channel to which the quantum service 16-3 listens (FIG. 2, block 1002). The quantum channel router 14 determines a message size of the message 42 (FIG. 2, block 1004). As discussed above, the quantum channel router 14 may determine the message size based on metadata contained in the message 42, or by measuring the message 42. The quantum channel router 14 determines that transmission of the message 42 would exceed a maximum channel capacity of the quantum channel 18-1 at a current point in time (FIG. 2, block 1006). In response to determining that transmission of the message 42 would exceed the maximum channel capacity of the quantum channel 18-1, the quantum channel router 14 does not transmit the message 42 onto the quantum channel 18-1 at the current point in time (FIG. 2, block 1008).

Figure 3:
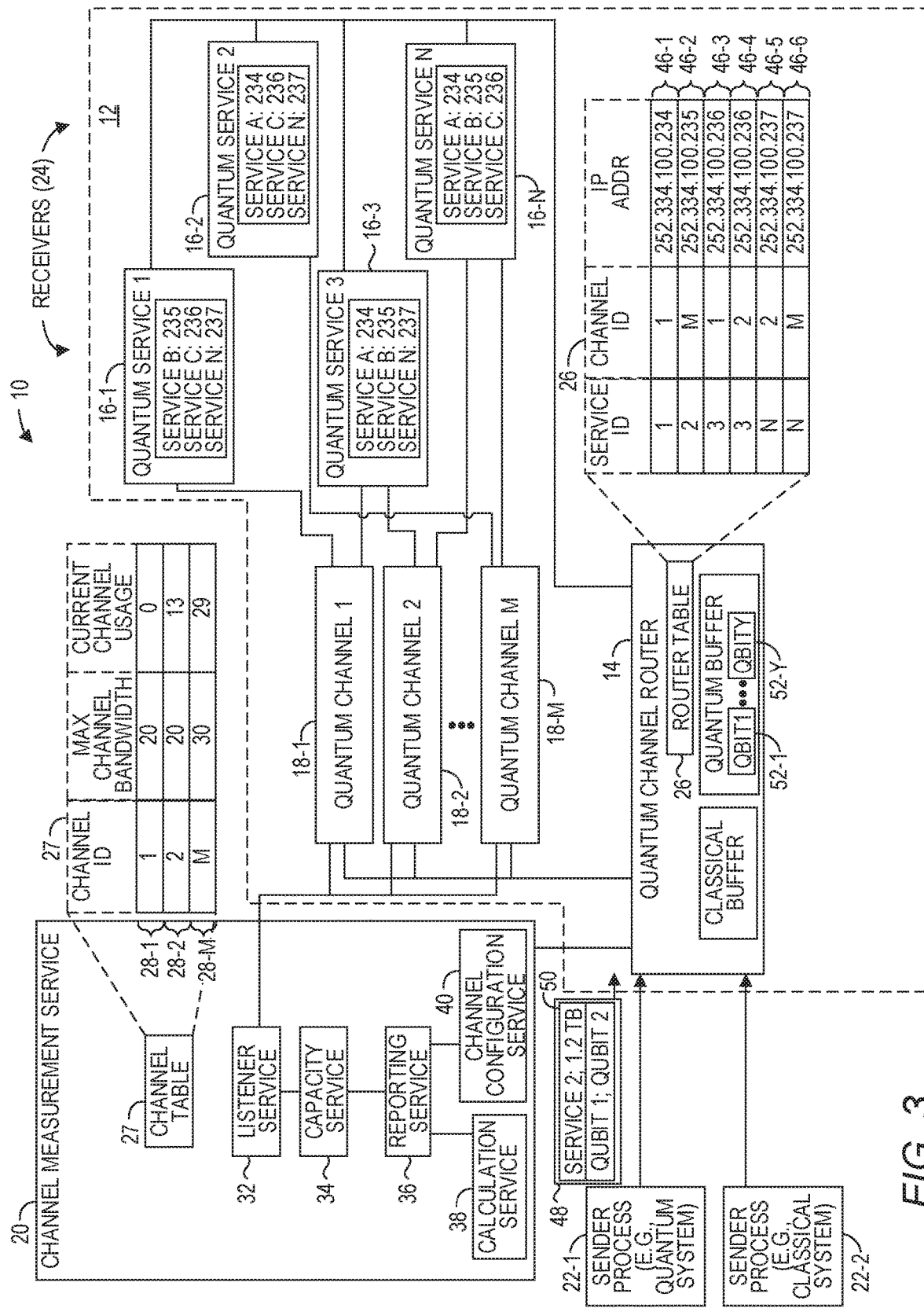
FIG. 3 is a block diagram illustrating the environment illustrated in FIG. 1 according to another example.

FIG. 3 is a block diagram illustrating the environment 10 according to another example. In this example, the quantum channel router 14 receives a message 48 from the sender 22-1. The message 48 includes metadata 50 that identifies a destination address of the quantum service 16-2. The message 48 is a quantum message and is encoded across two qubits. The metadata 50 also identifies a size of the message 48. The quantum channel router 14 accesses the router table 26 and, based on row 46-2, determines that the quantum service 16-2 listens to quantum channel 18-M. The quantum channel router 14 sends a message to the channel measurement service 20 that identifies the quantum channel 18-M and includes the size of the message 48. The channel measurement service 20 accesses the row 28-M of the channel table 27 to determine the maximum channel capacity and the current channel usage of the quantum channel 18-M. The channel measurement service 20 determines the current available capacity of the quantum channel 18-M based on a difference between the maximum channel capacity and the current channel usage of the quantum channel 18-M.

The channel measurement service 20 sends the quantum channel router 14 a message indicating that transmission of the message 48 at the current time would exceed the maximum channel capacity of the quantum channel 18-M. Based on this message, the quantum channel router 14 determines that transmission of the message 48 on the quantum channel 18-M would exceed the maximum channel capacity of the quantum channel 18-M at the current point in time. The quantum channel router 14 is communicatively coupled to a plurality of qubits 52-1-52-Y. The quantum channel router 14 stores the message 48 in two of the qubits 52-1-52-Y. The quantum channel router 14 periodically, such as every 100 milliseconds, every 200 milliseconds, or any other periodic interval, sends a message to the channel measurement service 20 that identifies the quantum channel 18-M and includes the size of the message 48, to determine whether the message 48 can be transmitted on the quantum channel 18-M without exceeding the maximum channel capacity of the quantum channel 18-M. At some point in time, the channel measurement service 20 sends the quantum channel router 14 a message indicating that transmission of the message 48 at the current time would not exceed the maximum channel capacity of the quantum channel 18-M. Based on this message, the quantum channel router 14 determines that transmission of the message 48 on the quantum channel 18-M would not exceed the maximum channel capacity of the quantum channel 18-M at the current point in time, and transmits the message 48 onto the quantum channel 18-M.

Figure 4:
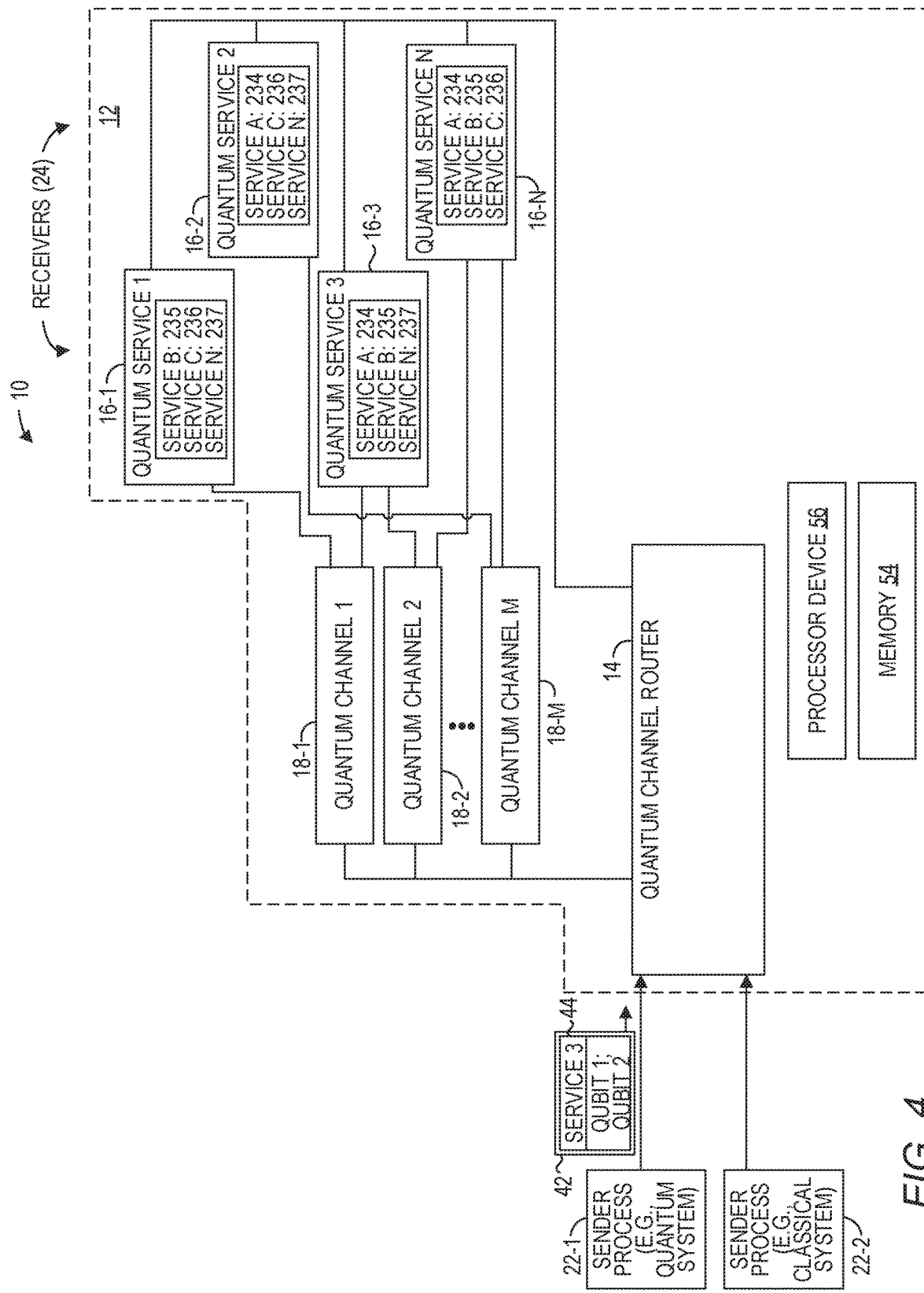
FIG. 4 is a simplified block diagram of the environment illustrated in FIG. 1 according to another example.

FIG. 4 is a simplified block diagram of the environment 10 according to one example. The environment 10 includes the quantum computing system 12, which in turn includes one or more memories 54 and one or more processor devices 56 coupled to the one or more memories 54. It is noted that because the quantum channel router 14 is a component of the quantum computing system 12, functionality implemented by the quantum channel router 14 may be attributed to the quantum computing system 12 generally. Moreover, in examples where the quantum channel router 14 comprises software instructions that program the one or more processor devices 56 to carry out functionality discussed herein, functionality implemented by the quantum channel router 14 may be attributed herein to the one or more processor devices 56.

The one or more processor devices 56 are to receive, via the quantum channel router 14 communicatively coupled to the plurality of quantum channels 18-1-18-M, the message 42 from the sender 22-1 of the plurality of senders 22-1-22-2, the message 42 is directed to a receiver 24 (e.g., the quantum service 16-3) of the plurality of receivers 24 (e.g., the plurality of quantum services 16-1-16-N), wherein each quantum channel 18-1-18-M is configured to convey a quantum message from a sender 22-1-22-2 to a receiver 24. The quantum channel router 14 identifies the quantum channel 18-1 as a quantum channel to which the quantum service 16-3 listens. The quantum channel router 14 determines a message size of the message 42. The quantum channel router 14 determines that transmission of the message 42 would exceed a maximum channel capacity of the quantum channel 18-1 at a current point in time, and, in response, does not transmit the message 42 onto the quantum channel 18-1 at the current point in time.

Figure 5:
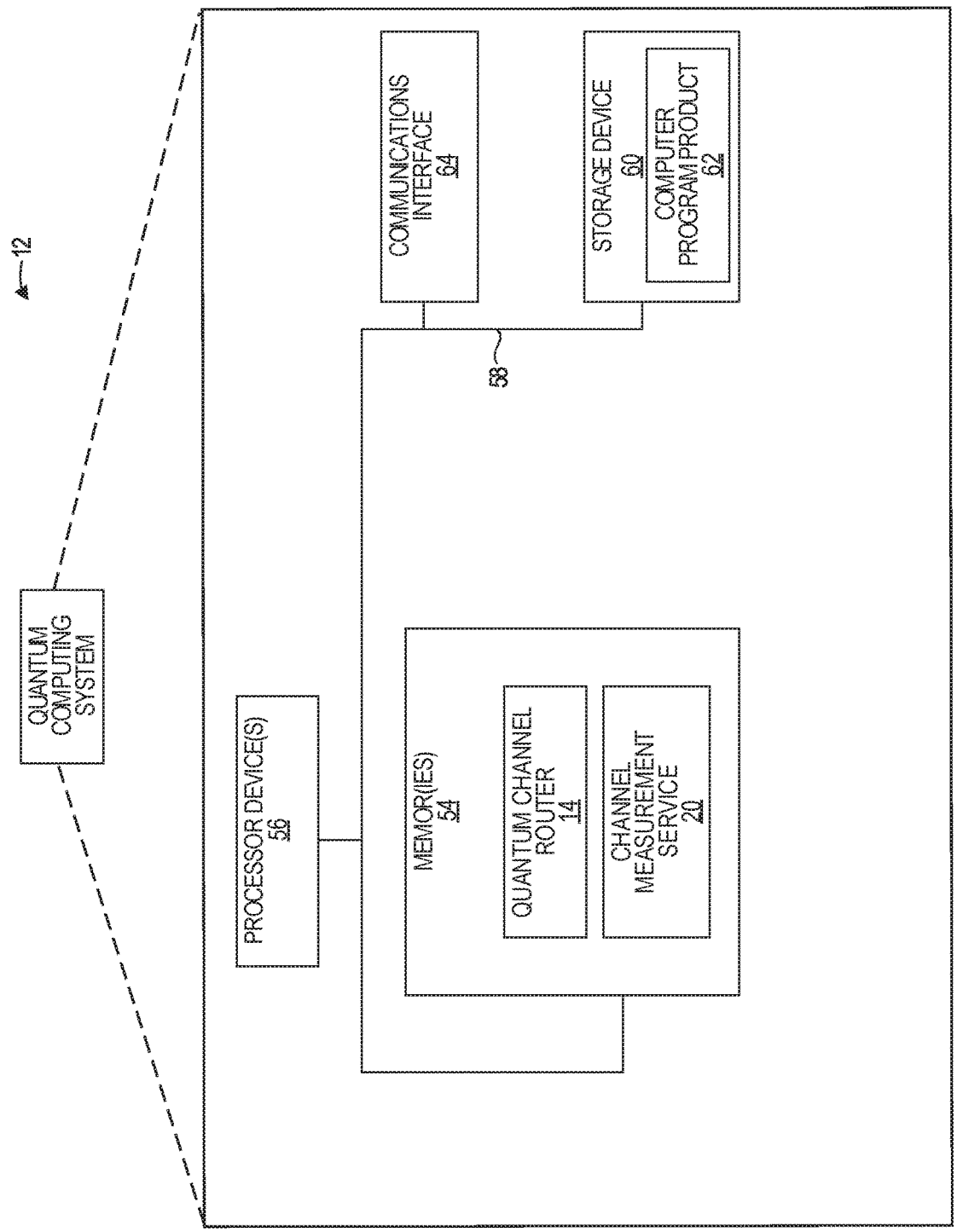
FIG. 5 is a block diagram of a quantum computing system suitable for implementing examples.

FIG. 5 is a block diagram of the quantum computing system 12 suitable for implementing examples according to one example. The quantum computing system 12 may comprise any computing or electronic device capable of including firmware, hardware, and/or executing software instructions to implement the functionality described herein in a quantum environment. The quantum computing system 12 includes the one or more processor devices 56, the one or more memories 54, and a system bus 58. The system bus 58 provides an interface for system components including, but not limited to, the one or more memories 54 and the one or more processor devices 56. The processor device(s) 56 can be any commercially available or proprietary processor device suitable for operating in a quantum environment. The quantum computing system 12 may further include or be coupled to a non-transitory computer-readable storage medium such as a storage device 60. The storage device 60 and other drives associated with computer-readable media and computer-usable media may provide non-volatile storage of data, data structures, computer-executable instructions, and the like.

A number of modules can be stored in the storage device 60 and in the memor(ies) 54, including the quantum channel router 14 and the channel measurement service 20. All or a portion of the examples may be implemented as a computer program product 62 stored on a transitory or non-transitory computer-usable or computer-readable storage medium, such as the storage device 60, which includes complex programming instructions, such as complex computer-readable program code, to cause the one or more processor devices 56 to carry out the steps described herein. Thus, the computer-readable program code can comprise software instructions for implementing the functionality of the examples described herein when executed on the one or more processor devices 56. The quantum computing system 12 may also include a communications interface 64, such as, by way of non-limiting example, an Ethernet transceiver, suitable for communicating with a sender 22.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a quantum channel router communicatively coupled to a plurality of quantum channels, a first message from a first sender of a plurality of senders, the first message directed to a first receiver of a plurality of receivers, wherein each quantum channel is configured to convey a quantum message from a sender to a receiver;
identifying, by the quantum channel router, a first quantum channel to which the first receiver listens;
determining, by the quantum channel router, a first message size of the first message;
determining that transmission of the first message would exceed a maximum channel capacity of the first quantum channel at a current point in time; and
in response to determining that transmission of the first message would exceed the maximum channel capacity of the first quantum channel, not transmitting the first message onto the first quantum channel at the current point in time.

2. The method of claim 1 wherein the first message comprises a quantum message comprising one or more qubits.

3. The method of claim 1 wherein identifying the first quantum channel comprises accessing a table that identifies each quantum channel of the plurality of quantum channels to which each receiver of the plurality of receivers listens.

4. The method of claim 1 further comprising determining a current available capacity of the first quantum channel, comprising:
determining the maximum channel capacity of the first quantum channel;
determining a current channel usage of the first quantum channel; and
determining the current available capacity to be a difference between the maximum channel capacity of the first quantum channel and the current channel usage of the first quantum channel.

5. The method of claim 1 wherein the first message comprises a quantum message, and wherein determining the first message size comprises accessing header information that identifies the first message size of the first quantum message.

6. The method of claim 1 wherein the first message comprises a quantum message, and wherein determining the first message size comprises performing a von Neumann measurement on the quantum message.

7. The method of claim 1 wherein the first message comprises a quantum message, and further comprising:
storing the first message in a plurality of qubits;
waiting a period of time;
determining that transmission of the first message would not exceed the maximum channel capacity of the first quantum channel at a current point in time; and
in response to determining that transmission of the first message would not exceed the maximum channel capacity of the first quantum channel, transmitting the first message onto the first quantum channel.

8. The method of claim 1 wherein the first message comprises a quantum message, and further comprising sending a message to the first sender to retry sending the first message to the quantum channel router at a future point in time.

9. The method of claim 1 wherein the first message comprises a quantum message, and further comprising:
in response to determining that transmission of the first message would exceed the maximum channel capacity of the first quantum channel:
identifying, by the quantum channel router, a second quantum channel to which the first receiver listens;
determining that transmission of the first message would not exceed a maximum channel capacity of the second quantum channel at the current point in time; and
transmitting the first message onto the second quantum channel.

10. The method of claim 1 further comprising:
identifying, by the quantum channel router, a second quantum channel to which the first receiver listens;
determining that a most recent message sent to the first receiver was sent on the second quantum channel; and
based on determining that the most recent message sent to the first receiver was sent on the second quantum channel, selecting the first quantum channel to use to send the first message to the first receiver.

11. A quantum computing system comprising:
one or more memories; and
one or more processor devices coupled to the one or more memories to:
receive, by a quantum channel router communicatively coupled to a plurality of quantum channels, a first message from a first sender of a plurality of senders, the first message directed to a first receiver of a plurality of receivers, wherein each quantum channel is configured to convey a quantum message from a sender to a receiver;
identify, by the quantum channel router, a first quantum channel to which the first receiver listens;
determine, by the quantum channel router, a first message size of the first message;
determine that transmission of the first message would exceed a maximum channel capacity of the first quantum channel at a current point in time; and
in response to determining that transmission of the first message would exceed the maximum channel capacity of the first quantum channel, not transmit the first message onto the first quantum channel at the current point in time.

12. The quantum computing system of claim 11 wherein to identify the first quantum channel, the one or more processor devices are further to access a table that identifies each quantum channel of the plurality of quantum channels to which each receiver of the plurality of receivers listens.

13. The quantum computing system of claim 11 wherein the one or more processor devices are further to determine a current available capacity of the first quantum channel, and wherein to determine the current available capacity, the one or more processor devices are further to:
  determine the maximum channel capacity of the first quantum channel;
  determine a current channel usage of the first quantum channel; and
  determine the current available capacity to be a difference between the maximum channel capacity of the first quantum channel and the current channel usage of the first quantum channel.

14. The quantum computing system of claim 11 wherein the first message comprises a quantum message, and wherein to determine the first message size, the one or more processor devices are further to perform a von Neumann measurement on the quantum message.

15. The quantum computing system of claim 11 wherein the first message comprises a quantum message, and wherein the one or more processor devices are further to:
  store the first message in a plurality of qubits;
  wait a period of time;
  determine that transmission of the first message would not exceed the maximum channel capacity of the first quantum channel at a current point in time; and
  in response to determining that transmission of the first message would not exceed the maximum channel capacity of the first quantum channel, transmit the first message onto the first quantum channel.

16. A non-transitory computer-readable storage medium that includes executable instructions configured to cause one or more processor devices to:
  receive, by a quantum channel router communicatively coupled to a plurality of quantum channels, a first message from a first sender of a plurality of senders, the first message directed to a first receiver of a plurality of receivers, wherein each quantum channel is configured to convey a quantum message from a sender to a receiver;
  identify, by the quantum channel router, a first quantum channel to which the first receiver listens;
  determine, by the quantum channel router, a first message size of the first message;
  determine that transmission of the first message would exceed a maximum channel capacity of the first quantum channel at a current point in time; and
  in response to determining that transmission of the first message would exceed the maximum channel capacity of the first quantum channel, not transmit the first message onto the first quantum channel at the current point in time.

17. The non-transitory computer-readable storage medium of claim 16 wherein to identify the first quantum channel, the instructions further cause the one or more processor devices to access a table that identifies each quantum channel of the plurality of quantum channels to which each receiver of the plurality of receivers listens.

18. The non-transitory computer-readable storage medium of claim 16 wherein the instructions are further configured to cause the one or more processor devices to determine a current available capacity of the first quantum channel, and wherein to determine the current available capacity, the instructions further cause the one or more processor devices to:
  determine the maximum channel capacity of the first quantum channel;
  determine a current channel usage of the first quantum channel; and
  determine the current available capacity to be a difference between the maximum channel capacity of the first quantum channel and the current channel usage of the first quantum channel.

19. The non-transitory computer-readable storage medium of claim 16 wherein the first message comprises a quantum message, and wherein to determine the first message size, the instructions further cause the one or more processor devices to perform a von Neumann measurement on the quantum message.

20. The non-transitory computer-readable storage medium of claim 16 wherein the first message comprises a quantum message, and wherein the instructions further cause the one or more processor devices to:
  store the first message in a plurality of qubits;
  wait a period of time;
  determine that transmission of the first message would not exceed the maximum channel capacity of the first quantum channel at a current point in time; and
  in response to determining that transmission of the first message would not exceed the maximum channel capacity of the first quantum channel, transmit the first message onto the first quantum channel.

* * * * *